United States Patent [19]

Baile et al.

[11] 3,852,473

[45] Dec. 3, 1974

[54] METHOD AND COMPOSITION FOR INCREASING FEED INTAKE OF ANIMALS USING TERTIARY ALCOHOLS

[75] Inventors: Clifton A. Baile, Glen Mills; Gregory Gallagher, Collegeville; Carol L. McLaughlin, Malvern; Robert Lee Webb, West Chester, all of Pa.

[73] Assignee: Smith Kline & French Laboratories, Philadelphia, Pa.

[22] Filed: Jan. 31, 1973

[21] Appl. No.: 328,235

[52] U.S. Cl................ 424/343, 424/300, 424/322
[51] Int. Cl............................................. A61k 27/00
[58] Field of Search................ 424/322, 300, 343

[56] References Cited
UNITED STATES PATENTS 2,915,398  12/1959  Wright ........................................ 99/2
2,915,551  12/1959  Wolf .......................................... 260/484
2,924,523  2/1960  Bachman et al. .......................... 99/2

OTHER PUBLICATIONS

Chemical Abstracts, Vol. 64 (1966), 5811.

*Primary Examiner*—Frederick E. Waddell
*Attorney, Agent, or Firm*—William H. Edgerton

[57] ABSTRACT

New methods and compositions for inducing polyphagia in growing or fattening meat producing animals such as sheep or cattle are described using as active ingredients tertiary alcohols or the corresponding carbamates, ureas, oxyureas or ureides. The active ingredients are used most usefully at sub-hypnotic quantities admixed in animal feed.

14 Claims, No Drawings

METHOD AND COMPOSITION FOR INCREASING FEED INTAKE OF ANIMALS USING TERTIARY ALCOHOLS

This invention relates to animal feed compositions and to novel methods of increasing the feed intake of growing or "fattening" animals by administering as the active ingredients in these compositions and methods certain tertiary alcohols and derivatives thereof. More specifically, this invention relates to a method of increasing feed intake in immature animals beyond satiety by administering internally the active ingredient, a tertiary alcohol or derivative thereof, as such or distributed uniformly in the feed of the animals. Oral or implant administration is preferred from a practical viewpoint.

Increasing the feed intake in meat producing animals, particularly ruminants, is an important commercial objective. Immature sheep and cattle are commonly fed for maximum growth rate in feed lots until they reach a marketable weight. When the desired weight is achieved, the animal is sold for slaughter. There is a normal feed intake for most animals due to both physical and metabolic factors. Animals become naturally satiated and thereafter will not feed voluntarily until the hunger drive again becomes dominant.

It has been unexpectedly found that, when certain tertiary alcohols or their urea, ureide, oxyurea or carbamate derivatives are administered to animals, polyphagic activity is induced, i.e., they eat more and gain weight at a faster rate resulting in better overall efficiency to the grower.

The practical effect of this invention is to induce meat producing animals, preferably sheep or cattle, to eat past the point of satiety or to induce polyphagia in the immature animal by administering internally, preferably by implant or orally, the active ingredients of this invention. The active ingredients are most conveniently dispersed uniformly throughout the normal feed of the subject animal in effective but nontoxic quantities.

The increased feed intake and concomitant weight gain of aninals is accomplished in accordance with this invention by a method which comprises administering internally to the animal a compound of the following basic structural formula:

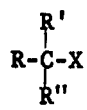

Formula 1 in which:

R is lower alkyl of from 1–9, preferably 1–5, carbon atoms or hydroxy lower alkyl of from 1–9, preferably 2–5, carbon atoms;

R' is lower alkyl of from 1–9, preferably 1–5, carbon atoms, or halo such as fluoro, chloro or bromo;

R" is lower alkyl of from 1–9, preferably 1–5, carbon atoms, lower alkenyl of from 2–9, preferably 2–5, carbon atoms, lower alkynyl of from 2–9, preferably 2–5, carbon atoms and, when R and R' are hydrogen or lower alkyl, phenyl; and, X is —OH, —NHCONH$_2$ (ureido), —ONHCONH$_2$ (oxyureido), —OCONH$_2$ (oxycarbamyl) or —CONHCONH$_2$ (carbonylureido).

A preferred group are those compounds of Formula I in which R, R' and R" are lower alkyl of from 1–5 carbon atoms. It will be recognized that certain of the active ingredients are not truly "tertiary alcohols" but this generic term is most conveniently used to describe the invention because the tertiary alcohols are the nub of the invention.

One skilled in the medicinal art will recognize that certain of the basic compounds of Formula I have been known to have medicinal effects in humans, especially hypotic effects, such as phenylacetyl urea; 3-methyl-1-pentyne-3-ol [Meparfynol], carbamic acid 1-ethyl-1-methyl-2-propynyl ester [Meparfynol carbamate], ($\alpha$-bromo-$\alpha$-ethylbutyryl)-urea [Carbromal] and 1-ethyl-1-methylpropyl carbamate [Emylcamate]. In the compositions and methods of this invention, the quantities of active ingredients are much below the hypnotic effect in animals, especially on a dose per unit of body weight basis. In fact, if the dose approaches the hypnotic effect, the very opposite action may be achieved, that is, the animal may become disinterested in food because of a general central nervous system depression. If sleepy or sedated the animal will not eat enough to satisfy its appetite and certainly not enough to cause a polyphagic effect. This effect has been noted in the test data presented hereafter. Therefore, in the context of this disclosure an overt pharmacodynamic or therapeutic effect such as hypnosis or sedation is classified as a toxic effect.

It will be recognized therefore that the active ingredients of this invention are old compounds known to the art. The tertiary alcohols are usually liquids and in the formulation of premixes or supplemented feeds this must be taken into account using standard techniques of the art. The alcoholic derivatives, for example the ureas, oxyureas, acylureas (ureides) or carbamates, are particularly useful because of their solid or crystalline state. The compounds which are the basis of this invention are notable for their very low chemical cost. Certain members of the groups are by-products of fermentation or chemical synthetic procedures.

Among the individual compounds most useful in the invention are benzyloxyurea, 1-ethyl-1-methylpropyl carbamate, 3-methyl-3-pentanol, 1-ethyl-1-methyl propyloxyurea, N-(1-ethyl-1-methylpropyl)urea, 3-methyl-1-pentyne-3-ol, carbamic acid 1-ethyl-1-methyl-2-propynyl ester and ($\alpha$-bromo-$\alpha$-ethylbutyryl)-urea. The solid nitrogen derived derivatives are preferred.

The compounds can be administered to growing meat producing animals intramuscularly or subcutaneously in the form of solutions for injection or preferably pellet implants. Most usually, the compounds can be mixed with conventional animal feed compositions. The feed compositions are then fed to ruminant or monogastric animals, according to methods well known to the agricultural art. The compounds are particularly advantageous when incorporated into the normal feeds of meat producing animals. Preferably the compounds are incorporated into fattening ruminant feeds.

The animal feeds most generally used in conjunction with the method of this invention are either various grain mixtures and/or roughage feeds such as hay commonly fed to meat producing animals especially cattle or sheep feeds. The amount of additive used to supplement such feeds will be in an amount sufficient to induce polyphagia, i.e., to increase feed intake and/or thereby to improve the feed efficiency of the animal but not to have a toxic or noxious effect; within the broad range of from about 10 g. to 2 kg. per ton of feed, preferably from about 100 g. to about 1 kg./ton. An average sheep will ingest about 3–4 lbs. of feed daily; an average feed lot steer about 20–25 lbs. Therefore, the preferable broad range of dosage for ruminants by any method of internal administration will range approximately from 50 mg. to 10 g. per day depending on the potency of the ingredient for these purposes. It will be appreciated that the exemplary dose ranges given are for a generic group of chemical compounds having varying potencies. The gist of the invention claimed is that certain sub-therapeutic or sub-hypnotic quantities of the chemical compounds administered as described have a polyphagic effect.

For commercial use, the active ingredients usually are most readily used as premix formulations in which the chemical is distributed uniformly throughout a standard animal organic or inorganic feed carrier in a concentrated form which is conveniently packaged and shipped to the feed mixer. This premix or concentrate is then in turn mixed uniformly with a normal diet for the animal as desired by the grower or the feed mixer. Examples of such carriers for premix compositions are soybean meal, corn oil, ground corn, barley, wheat, mineral mixtures such as vermiculite, diatomaceous earth, corn gluten meal, corn distillers solubles or soy-flour. The active ingredient will be in amounts to satisfy the criteria set forth above for whole feed. The active ingredient will usually be present in from about 1–75 percent by weight of the premix composition.

If the ingredients are liquids or unstable materials, they may optionally be adsorbed on silica, kieselguhr etc. or coated with a solid, absorbable fat or resin by standard spray drying or congealing techniques (See U.S. Pat. No. 3,660,562).

The animal feeds themselves may also contain roughages such as cellulose, hay, straw, silages, corn stalks, cotton seed hulls, oats, barley and cereal brans; natural oils such as animal fats, fish oils, safflower oil, peanut oil, and cottonseed oil; antioxidants, minerals, vitamins, antibiotics, anthelmintics; and other appropriate medicaments.

Examples of typical prepared animal feed is as follows:

EXAMPLE 1

| Ingredients | Weight per cent |
| --- | --- |
| Mixed hay | 40.0 |
| Ground yellow corn | 45.0 |
| Soybean oil meal | 7.0 |
| Cane molasses | 7.0 |
| Dicalcium phosphate | 0.5 |
| Trace minerals salt | .5 |
| Vitamin A | 300 I.U./lb. |
| Vitamin D | 150 I.U./lb. |
| 1-ethyl-1-methylpropyl carbamate | 1 lb./ton of feed |

EXAMPLE 2

An example of a suitable premix is as follows:

| | |
| --- | --- |
| N-(1-ethyl-1-methylpropyl)-urea | 2 lb. |
| Ground yellow corn | to 10 lbs. |

EXAMPLE 3

In the field the active ingredients may be administered by means of salt or molasses blocks. A typical block may be prepared using the following conditions:

| Ingredients | Weight per cent |
| --- | --- |
| Dried cane molasses | 29.5 |
| Ground soybean hulls | 24.90 |
| 3-Methyl-3-pentanol | 20.00 |
| Granulated salt | 21.59 |
| Trace minerals and vitamins | 0.20 |
| Stabilized animal fat | 1.11 |
| Moisture | 2.66 |

EXAMPLE 4 — Cattle Diet

| Ingredients | Weight per cent | |
| --- | --- | --- |
| Ground shelled corn | 65.85 | |
| Mixed ground hay | 20.00 | |
| Dried molasses | 6.00 | |
| Soybean meal | 6.00 | |
| | 1.5 | lb./ton feed |
| 3-Methyl-1-pentyne-3-ol | .55 | |
| Trace mineral salt | .50 | |
| Dicalcium phosphate | .40 | |
| Ground limestone | .70 | |
| Vitamin A (30,000 units/gms.) | 66.7 | gm./ton |
| Vitamin $D_2$(16,000,000 units/lb.) | 7.1 | gm./ton |

The method of this invention comprises allowing the cattle or sheep to grace or be fed ad libitum on the supplemented rations or to be fed on a regular schedule.

EXAMPLE 5 — Implant Pellets

| Ingredients | Amount |
| --- | --- |
| Phenylacetylurea | 100 mg. |
| Calcium sulfate, dihydrate | 20 mg. |
| Gelatin | 4 mg. |
| Magnesium stearate | 1 mg. |
| Talc | 2 mg. |

The phenylacetylurea and calcium sulfate, dihydrate are mixed and passed through a No. 40 standard mesh screen. The screened mixture is then granulated with hot 15 percent gelatin solution, screened through a No. 10 mesh screen and dried overnight at 120°F. The granules are again screened through a No. 40 mesh screen and mixed with the magnesium stearate and talc. The granules are compressed into implants using a ⅛ inch flat face punch and die. One implant is administered intramuscularly.

EXAMPLE 6 — Screening Tests

A qualitative test for polyphagic activity is the 2 hour peripheral (i.v.) injection test. The protocol for this test and representative test results follow.

The active ingredient was tested in 8 sheep 8 cattle weighing 50–60 and 200–300 kg., respectively. Feed and water were available ad libitum.

A control of dimethylsulfoxide (DMS) was maintained. The procedure comprised;- 60 min. weigh feed, 0 min. inject chemical in 1.5 ml. DMS for sheep and 5.0 ml. for cattle intravenously then weigh feed. The result is entered as a percent of Control Intake, of course the control being 100 percent.

SHEEP

| R | R' | R'' | X | Dose(mg.) | %(120 min.) |
|---|---|---|---|---|---|
| $C_2H_5$ | Br | $C_2H_5$ | $CONHCONH_2$ | 31 | 142 |
|  |  |  |  | 62 | 164 |
|  |  |  |  | 125 | 136 |
|  |  |  |  | 500 | 77 |
| $C_2H_5$ | $CH_3$ | $C \equiv CH$ | OH | 31 | 100 |
|  |  |  |  | 62 | 164 |
|  |  |  |  | 125 | 148 |
|  |  |  |  | 500 | 226 |
| $CH_3$ | $CH_3$ | $C \equiv CH$ | OH | 31 | 110 |
|  |  |  |  | 62 | 97 |
|  |  |  |  | 125 | 130 |
|  |  |  |  | 500 | 70 |
| $(n)C_5H_{11}$ | $CH_3$ | $C \equiv CH$ | OH | 62 | 104 |
|  |  |  |  | 125 | 157 |
|  |  |  |  | 500 | 0 |
| $C_2H_5$ | $CH_3$ | $C_2H_5$ | OH | 62 | 138 |
|  |  |  |  | 125 | 154 |
|  |  |  |  | 300 | 185 |
|  |  |  |  | 600 | 127 |
| $C_2H_5$ | $C_2H_5$ | $CH_3$ | $OCONH_2$ | 62 | 146 |
|  |  |  |  | 125 | 203 |
|  |  |  |  | 250 | 193 |
|  |  |  |  | 500 | 319 |
|  |  |  |  | 750 | 272 |
| $CH_3$ | $CH_3$ | $CH_3$ | $OCONH_2$ | 500 | 109 |
|  |  |  |  | 1500 | 139 |
| $CH_3$ | $CH_3$ | $CH_3$ | $NHCONH_2$ | 250 | 129 |
| $CH_3$ | $CH_3$ | $C_6H_5$ | OH | 62 | 66 |
|  |  |  |  | 125 | 131 |
|  |  |  |  | 500 | 88 |
| H | H | $C_6H_5$ | $CONHCONH_2$ | 31 | 123 |
|  |  |  |  | 62 | 144 |
|  |  |  |  | 125 | 167 |
|  |  |  |  | 200 | 141 |
|  |  |  |  | 500 | 133 |
| H | H | $C_6H_5$ | $ONHCONH_2$ | 300 | 122 |
| H | H | $C_6H_5$ | $OCONH_2$ | 125 | 133 |
|  |  |  |  | 250 | 73 |
| H | $CH_3$ | iso—$C_4H_9$ | OH | 125 | 85 |
|  |  |  |  | 500 | 127 |
|  |  |  |  | 823 | 77 |
| iso—$C_3H_7$ | $CH_3$ | $CH_3$ | OH | 125 | 105 |
|  |  |  |  | 500 | 123 |
| $C_2H_5$ | $C_2H_5$ | $C_2H_5$ | OH | 125 | 124 |
|  |  |  |  | 500 | 143 |
| $CH_3$ | $CH_3$ | $C_2H_5$ | OH | 125 | 123 |
|  |  |  |  | 500 | 172 |
| $CH_3$ | $C_2H_5$ | $C_4H_9$ | OH | 31 | 95 |
|  |  |  |  | 125 | 115 |
| $CH_3$ | $CH_3$ | $C_4H_9$ | OH | 62 | 71 |
|  |  |  |  | 125 | 121 |
|  |  |  |  | 500 | 50 |
| $CH_3$ | $CH_3$ | $C_5H_{11}$ | OH | 31 | 148 |
|  |  |  |  | 62 | 91 |
|  |  |  |  | 125 | 109 |
| 2—$(OH)C_3H_6$ | $CH_3$ | $CH_3$ | OH | 62 | 56 |
|  |  |  |  | 125 | 144 |
|  |  |  |  | 500 | 126 |
| $CH_3$ | $CH_3$ | $CH_2=CH_2CH_2$ | OH | 62 | 99 |
|  |  |  |  | 125 | 151 |
|  |  |  |  | 250 | 155 |
| $CH_3$ | iso—$C_3H_7$ | $C_2H_5$ | OH | 62 | 144 |
|  |  |  |  | 125 | 195 |
|  |  |  |  | 500 | 104 |
| $CH_3$ | $CH_3$ | $CH_3C \equiv C$ | OH | 125 | 103 |
|  |  |  |  | 500 | 211 |
|  |  |  |  | 1000 | 166 |
| $CH_3$ | $CH_3$ | $C_2H_5$ | $NHCONH_2$ | 250 | 110 |
|  |  |  |  | 500 | 106 |
| $CH_3$ | $CH_3$ | iso—$C_4H_9$ | OH | 62 | 104 |
|  |  |  |  | 125 | 145 |
|  |  |  |  | 500 | 38 |
| $CH_3$ | $C_2H_5$ | $CH_2=CH$ | OH | 125 | 123 |
|  |  |  |  | 500 | 160 |
|  |  |  |  | 100 | 78 |
| iso—$C_3H_7$ | iso—$C_3H_7$ | $CH \equiv C$ | OH | 62 | 110 |
|  |  |  |  | 125 | 170 |
| $C_2H_5$ | ClCH=CH | $CH \equiv C$ | OH | 31 | 45 |
|  |  |  |  | 62 | 160 |
|  |  |  |  | 125 | 105 |
| $CH_3$ | $C_2H_5$ | $CH \equiv C$ | $OCONH_2$ | 31 | 112 |
|  |  |  |  | 62 | 54 |
|  |  |  |  | 125 | 139 |
| $CH_3$ | $C_2H_5$ | $C_2H_5$ | $NHCONH_2$ | 62 | 153 |
|  |  |  |  | 125 | 147 |
|  |  |  |  | 250 | 221 |
|  |  |  |  | 500 | 142 |
| $CH_3$ | $C_2H_5$ | BrC=CBr | OH | 62 | 85 |
|  |  |  |  | 125 | 162 |
|  |  |  |  | 500 | 119 |
| $CH_3$ | $C_2H_5$ | $CH \equiv CC_5H_{10}$ | OH | 125 | 150 |
|  |  |  |  | 500 | 78 |

EXAMPLE 7 — Secondary Tests
CATTLE

| R | R' | R'' | X | Dose(mg.) | %(120 min.) |
|---|---|---|---|---|---|
| $CH_3$ | $C_2H_5$ | $C_2H_5$ | $OCONH_2$ | 625 | 133 |
|  |  |  |  | 1250 | 128 |
| H | H | $C_6H_5$ | $ONHCONH_2$ | 1000 | 113 |
| H | H | $C_6H_5$ | $CONHCONH_2$ | 250 | 103 |
|  |  |  |  | 375 | 77 |
|  |  |  |  | 375 | 270 |
|  |  |  |  | 750 | 165 |
|  |  |  |  | 1500 | 100 |
|  |  |  |  | 1500 | 179 |
|  |  |  |  | 150 | 108 |
| $CH_3$ | $C_2H_5$ | $C_2H_5$ | OH | 1250 | 84 |
|  |  |  |  | 1500 | 103 |
|  |  |  |  | 2500 | 100 |
|  |  |  |  | 3750 | 149 |
| $CH_3$ | $C_2H_5$ | $C_2H_5$ | $NHCONH_2$ | 300 | 80 |
|  |  |  |  | 600 | 87 |
|  |  |  |  | 1250 | 113 |
|  |  |  |  | 1250 | 117 |
| $CH_3$ | $C_2H_5$ | $C\equiv CH$ | OH | 1250 | 154 |
| $C_2H_5$ | Br | $C_2H_5$ | $CONHCONH_2$ | 625 | 100 |
|  |  |  |  | 1250 | 94 |
|  |  |  |  | 2500 | 129 |
| iso—$C_3H_7$ | iso—$C_3H_7$ | $C\equiv CH$ | OH | 1250 | 102 |
| $CH_3$ | $CH_3$ | $C_6H_5$ | OH | 1250 | 120 |

We claim:

1. The method of increasing feed intake in an immature ruminant animal subject comprising administering orally or by implant to said animal subject a quantity effective for increasing feed intake but nontoxic to the subject of a tertiary alcohol having the formula:

$$RR'R''CX$$

in which:
R is lower alkyl of from 1–9 carbons or hydroxy lower alkyl of from 1–9 carbons;
R' is lower alkyl of from 1–9 carbons, fluoro, bromo or chloro;
R'' is lower alkyl of from 1–9 carbons, lower alkenyl of from 2–9 carbons and, when R and R' are lower alkyl or hydrogen, phenyl; and
X is —OH.

2. The method of claim 1 in which R, R' and R'' are lower alkyl of from 1–5 carbons.
3. The method of claim 1 in which the animal is sheep or cattle.
4. The method of claim 2 in which the subject animal is sheep or cattle.
5. The method of claim 1 in which the internal administration is orally and admixed with the animal feed.
6. The method of claim 5 in which the quantity of tertiary alcohol derivative is from about 10 g.–2 kg. per ton of feed.
7. The method of claim 5 in which the quantity of tertiary alcohol derivative is about 50 mg. –10 g. per animal subject.
8. A ruminant animal feed composition comprising an animal feed carrier supplemented by a quantity of active ingredient effective for increasing feed intake but nontoxic to the animal, said active ingredient being a tertiary alcohol derivative of the formula:

$$RR'R''CX$$

in which:
R is lower alkyl of from 1–9 carbons or hydroxy lower alkyl of from 1–9 carbons;
R' is lower alkyl of from 1–9 carbons, fluoro, bromo or chloro;
R'' is lower alkyl of from 1–9 carbons, lower alkenyl of from 2–9 carbons and, when R and R' are lower alkyl or hydrogen R'' is phenyl; and
X is —OH.

9. The feed composition of claim 8 in which the said active ingredient is a tertiary alcohol of the formula:

$$RR'R''COH$$

in which R, R' and R'' are lower alkyl of 1–5 carbons.

10. The feed composition of claim 1 in which the said composition is a whole feed adapted for fattening immature ruminant animals.
11. The feed composition of claim 8 in which the said composition is a premix composition adapted for mixing uniformly throughout a whole animal feed adapted for fattening immature ruminant animals.
12. The feed composition of claim 10 in which the active ingredient is present within the range of from about 100 g. to 2 kg. per ton of feed.
13. The feed composition of claim 11 in which the active ingredient is present at the rate of about 1–75 percent by weight.
14. The feed composition of claim 9 in which the active ingredient is present within the range of from about 100 g. to 2 kg. per ton of feed.

* * * * *